United States Patent
Kawai et al.

(10) Patent No.: US 7,973,640 B2
(45) Date of Patent: Jul. 5, 2011

(54) OUTPUT MANAGEMENT SYSTEM, OUTPUT MANAGEMENT METHOD, AND OUTPUT MANAGEMENT PROGRAM

(75) Inventors: Takanao Kawai, Osaka (JP); Sachiko Yoshimura, Osaka (JP); Issei Tsuhara, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 1001 days.

(21) Appl. No.: 11/882,914

(22) Filed: Aug. 7, 2007

(65) Prior Publication Data

US 2008/0040817 A1 Feb. 14, 2008

(30) Foreign Application Priority Data

Aug. 9, 2006 (JP) .................................. 2006-216931

(51) Int. Cl.
*G05B 19/00* (2006.01)
*G05B 23/00* (2006.01)
*G08B 29/00* (2006.01)

(52) U.S. Cl. ......................................... 340/5.2; 340/5.7
(58) Field of Classification Search .................... 340/5.2
See application file for complete search history.

(56) References Cited

U.S. PATENT DOCUMENTS

| 5,979,754 | A * | 11/1999 | Martin et al. .................. 235/382 |
| 2001/0053301 | A1* | 12/2001 | Nishii .............................. 400/63 |
| 2004/0054962 | A1* | 3/2004 | Shima et al. .................. 715/500 |
| 2005/0200885 | A1 | 9/2005 | Nishizawa et al. |
| 2006/0112428 | A1* | 5/2006 | Etelapera ........................ 726/16 |

FOREIGN PATENT DOCUMENTS

JP 2000-072325 3/2000

* cited by examiner

*Primary Examiner* — Brian A Zimmerman
*Assistant Examiner* — Omer S Khan
(74) *Attorney, Agent, or Firm* — Manabu Kanesaka

(57) ABSTRACT

An output management system includes a terminal device and an output device, wherein the output management system includes an area management device for managing an access of the user to an area in which the output device is located and a shutoff device for shutting off the access of the user to the area. The area management device has a storing unit for storing registered authentication data, an inputting unit for inputting input authenticated data, a checking unit for checking the input authenticated data and the registered authentication data, and a shutoff releasing unit for releasing the shutoff by the shutoff device when the input authenticated data and the registered authentication data conform to each other.

12 Claims, 4 Drawing Sheets

| | REGISTERED AUTHENTICATION DATA | | | INPUT AUTHENTICATED DATA | | | | | |
|---|---|---|---|---|---|---|---|---|---|
| REGISTRATION NUMBER | USER ID | PASSWORD | SECOND AUTHENTICATED DATA | CHECK | FIRST AUTHENTICATED DATA | CHECK | ROOM NUMBER | LOCK |
| 001 | aaaaa | 11111 | | 0 | | 0 | | 0 |
| 002 | bbbbb | 22222 | bbbbb,22222 | 1 | | 0 | A | 1 |
| 003 | ccccc | 33333 | xxxxx,99999 | 0 | | 0 | | 0 |
| 004 | ddddd | 44444 | ddddd,44444 | 1 | yyyyy,99999 | 0 | B | 1 |
| 005 | eeeee | 55555 | eeeee,55555 | 1 | eeeee,55555 | 1 | C | 0 |

Fig. 4

OUTPUT MANAGEMENT SYSTEM, OUTPUT MANAGEMENT METHOD, AND OUTPUT MANAGEMENT PROGRAM

BACKGROUND OF THE INVENTION

1. Field of the Invention

The present invention relates to an output management system, and more specifically, relates to the output management system for limiting access to an area in which an output device is located, thereby improving security, by allowing the output device, such as an image-forming device without a security function, work with a data management device, an area management device and a shutoff device.

2. Description of the Related Art

Recently, amid mounting concern over security, the target thereof reaches printed matter, which is output by an image-forming device or the like, so that realization of a method and device for outputting print content without being known by others is in demand.

Therefore, the image-forming device provided with unit for limiting the output of the printed matter by a password and catch trays with lock are proposed.

Further a MFP (Multi Function Peripheral) which has multiple functions as a printer, a fax machine and a copier, which detects approach of a user by an RFID reader mounted on a printing device when the user having an RFID in which authentication information is stored approaches the printing device, and outputs the text, which the user instructed to output, has been proposed.

However, in the conventionally proposed image-forming device as described above, it is necessary to newly prepare the image-forming device provided with the above-described function or to make alteration, so that a burden such as cost is large.

Further, since it is configured to start the print process after the password is input to the image-forming device, inconvenience, such that the user have to wait until the print process is finished, is envisaged.

On the other hand, in the conventionally proposed MFP as described-above, it is envisaged that a mix-up may occur depending on the timing to pickup the printed matter, such as in a case in which a plurality of users give instructions to output to the same MFP. In such a case, the confidentiality of the printed matter would be lost, so that it is difficult to maintain the necessary security.

Moreover, since the printing process is started after detecting that the user enters a certain area, it is inconvenient that the user still has to wait especially when performing the printing process of which output size is large.

SUMMARY OF THE INVENTION

In order to solve the above-described problems, according to one embodiment of the present invention, it is provided with an area management device for managing access of a user to an area in which an output device is located, and a shutoff device for shutting off the access of the user to the area, wherein the area management device has storing unit for storing registered authentication data, inputting unit for inputting input authenticated data, checking unit for checking the input authenticated data and the registered authentication data, and shutoff releasing unit for releasing a shutoff by the shutoff unit when the input authenticated data and the registered authentication data conform to each other.

BRIEF DESCRIPTION OF THE DRAWINGS

FIG. 4 is an illustration diagram of an authentication table used for a user authentication in the printing system according to one embodiment of the present invention.

DESCRIPTION OF THE PREFERRED EMBODIMENTS

Hereinafter, a preferred embodiment of the present invention will be described with reference to FIGS. 1 to 4.

Herein, an output management system (printing system) of this embodiment, which will be shown below, is realized by a process, means, and a function, performed by a computer by an instruction from a program (software). The program gives instructions to each component of the computer to allow the same to perform predetermined process and function, which will be shown below. That is to say, each process and means in the printing system of this embodiment will be realized by specific means in which the program and the computer work together.

Meanwhile, an entire or a part of the program is provided, for example, by a magnetic disk, an optical disk, a semiconductor memory, and any other computer-readable recording media, and the program read from the recording media is installed on the computer and is executed. And, the program may be directly loaded onto the computer through a communication line, without using the recording media, and may be executed.

Figure 1:
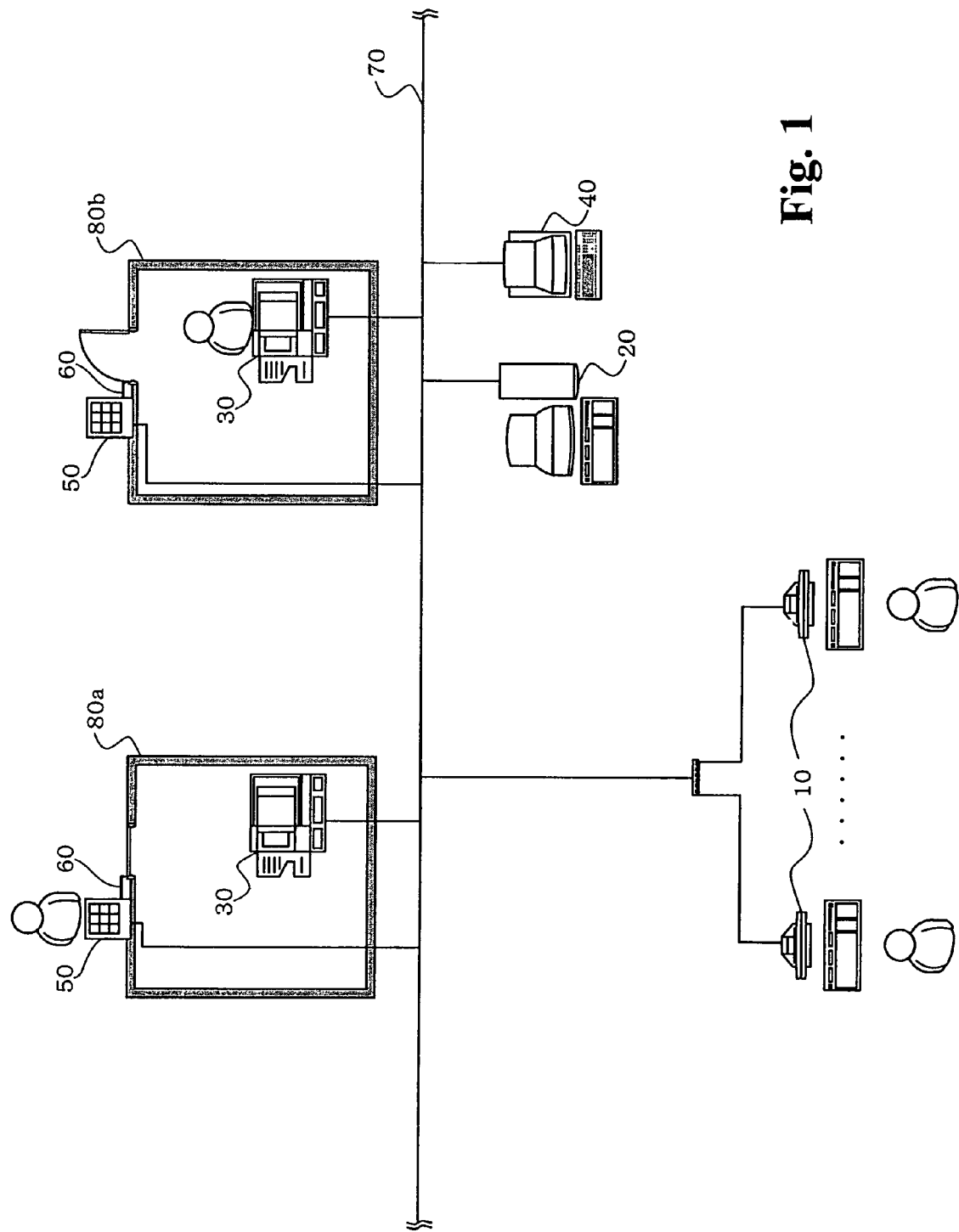
FIG. 1 is a system configuration diagram of a printing system according to one embodiment of the present invention.
Figure 2:
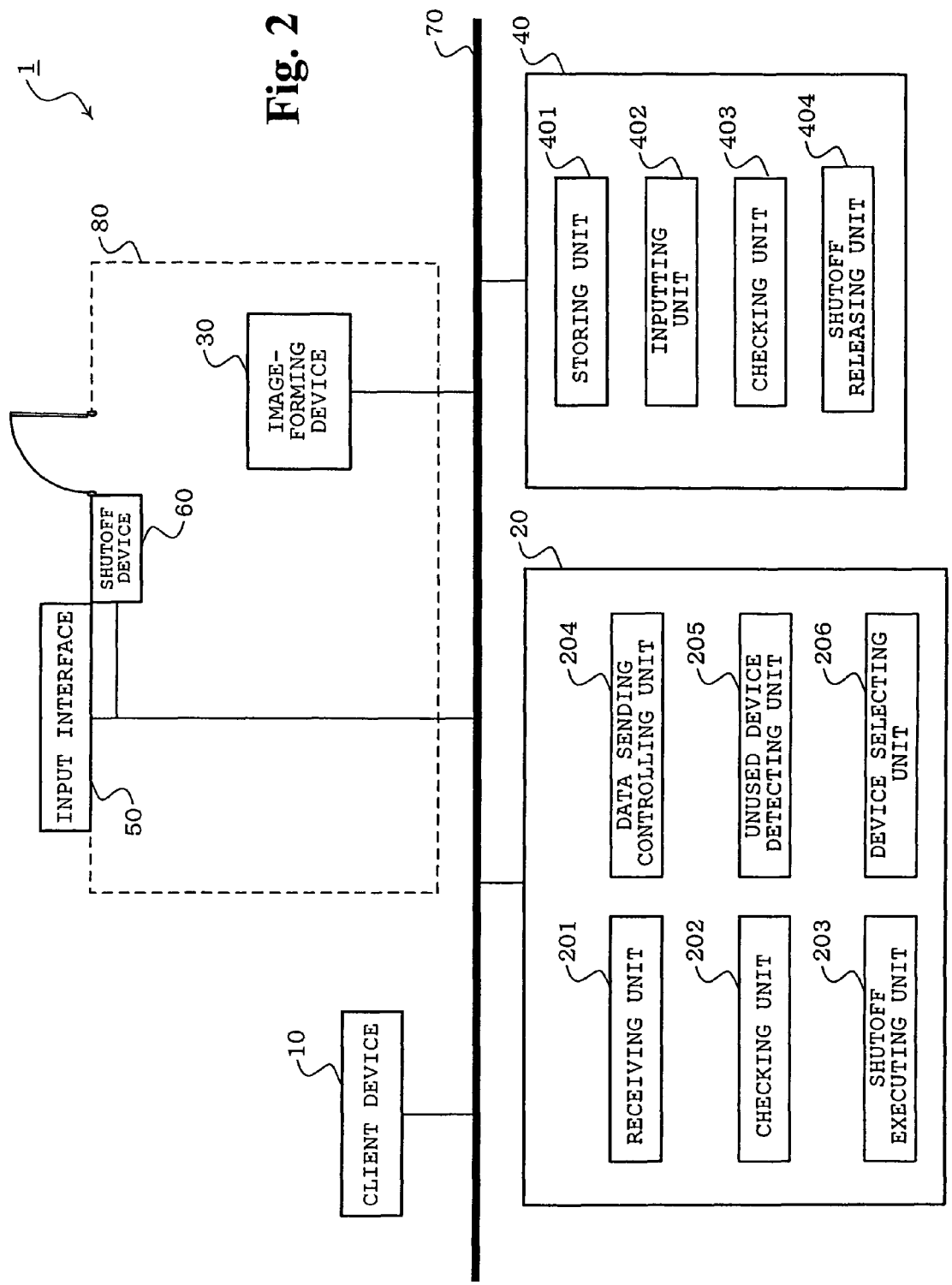
FIG. 2 is a block diagram of the printing system according to one embodiment of the present invention.

FIG. 1 is a system configuration diagram of a printing system 1 according to one embodiment of the present invention, and FIG. 2 is a block diagram thereof.

As shown in these figures, the printing system 1 of this embodiment includes a client device 10 as a terminal device, a print management device 20 as a data management device, an image-forming device 30 as an output device, an area management device 40, an input interface 50, and a network 70 to connect them to each other.

And, one image-forming device 30 is located in each dedicated room 80, which indicates an area thereof.

The printing system 1 of this embodiment controls such that only an authenticated user is allowed to enter the room 80 and others are not able to enter the room, by interlocking locking and unlocking of a door provided on the room 80 with user authentication, thereby improving security of a printed matter.

Hereinafter, each main configuration of this embodiment will be described in detail.

[Client Device 10]

The client device 10 is the terminal device with which the user gives instructions to output print data and sends the output data, and is generally includes an information-processing device, such as a personal computer.

And, the client device 10 not only sends the print data to the print management device 20, but also sends data (transmitted authenticated data) for performing user authentication, such as an ID and a password. The reason why the client device 10 sends the transmitted authenticated data to the print management device 20 is that the print management device 20 is allowed to verify validity of the user who requests the print process by the user authentication, and to print out only the print data from the user whose validity is recognized.

[Print Management Device 20]

The print management device 20 is the data management device for performing the user authentication and controlling sending of the print data between the client device 10 and the image-forming device 30 under the cooperation with the area management device 40, and is generally includes the information-processing device such as a personal computer and a workstation.

As a specific method of the user authentication, the print management device 20 receives the authenticated data (transmitted authenticated data) sent from the client device 10 for the user authentication (receiving unit 201), and checks the same against authentication data (registered authentication data) stored in the area management device 40 in advance (checking unit 202).

Then, in a case in which both data conform to each other, the print management device 20 locks the door (shutoff executing unit 203), and after that, sends the print data to the image-forming device 30 (data sending control unit 204) to be printed out by output means.

And, the print management device 20 also includes means for detecting an unused image-forming device 30 (unused device detecting unit 205) and means for selecting one image-forming device from detected one or more image-forming devices (device selecting unit 206). As a method for detecting the unused image-forming device 30, for example, the print management device 20 may detect by detecting whether the door lock is unlocked or not, whether the image-forming device 30 operates or not, and whether a person is in the area or not by a human sensor.

[Image-Forming Device 30]

The image-forming device 30 is the output device for receiving the print data, which is output from the client device 10, through the print management device 20 and printing out the same, and a network printer or the like corresponds to the same.

Meanwhile, in this embodiment, the image-forming device 30 is located in a certain area (room 80) and access to the image-forming device 30 is limited by an access control.

[Area Management Device 40]

The area management device 40 not only authenticates the transmitted authenticated data from the client device 10, but also authenticates input authenticated data, which is input from the input interface 50, thereby judging the validity of the user.

Specifically, the area management device 40 is provided with means for storing the registered authentication data, such as the ID and the password necessary for identifying the user, in a predetermined authentication table or the like (refer to FIG. 4) in advance (storing unit 401), means for inputting the authenticated data through the input interface or the like (inputting unit 402), and means for checking the registered authentication data and the authenticated data and judging the validity of the user depending on whether the data conform to each other (checking unit 403).

And, the area management device 40 controls the access to the area in which the image-forming device 30 is located, through the user authentication by the checking means.

Specifically, the area management device 40 checks the authenticated data, which is directly input from the input interface 50, against the registered authentication data of the user authenticated by the checking unit 202, then, if the data conforms to each other, unlocks the door to allow the user to enter the room (shutoff releasing unit 404).

[Input Interface 50]

The input interface 50 is an input device installed to the room 80 in which the image-forming device 30 is located, for inputting the input authenticated data for performing the user authentication.

As specific inputting unit composing the input interface 50, there are, for example, a ten-key for inputting the ID and the password, a card reader for reading an ID card or the like, a sensor for reading a part of a human body such as a fingerprint and a voiceprint, an RFID reader for reading identification information written in an IC tag, a card reader for reading the card or the like used for TOKEN authentication, and the like, and the authenticated data, which is input by the input interface 50, is authenticated by the area management device 40.

[Shutoff Device 60]

The shutoff device 60 locks or unlocks the door for entering and leaving the room 80 in which the image-forming device 30 is located, and an electric lock or the like corresponds to the same.

Specifically, when the validity of the transmitted authenticated data from the client device 10 is recognized by the above-described shutoff executing unit 203, the shutoff device 60 locks the door of the corresponding room, and subsequently, when the validity of the input authenticated data of the user, which is input by the input interface 50, is recognized by the above-described shutoff releasing unit 404, the shutoff device 60 unlocks the door.

In this manner, the printing system of this embodiment is configured to control the access to the image-forming device 30 by interlocking the locking and unlocking of the door by the shutoff device 60 with the user authentication, thereby limiting pickup of the printed matter.

[Network 70]

The network 70 is a communication network including a LAN (local area network), a WAN (wide area network) and the like, for connecting each device to allow control thereof. Therefore, it is also possible to control or the like each device through the Internet.

Next, procedure in the printing system of this embodiment configured as described above will be described with reference to FIGS. 3 and 4.

Figure 3:
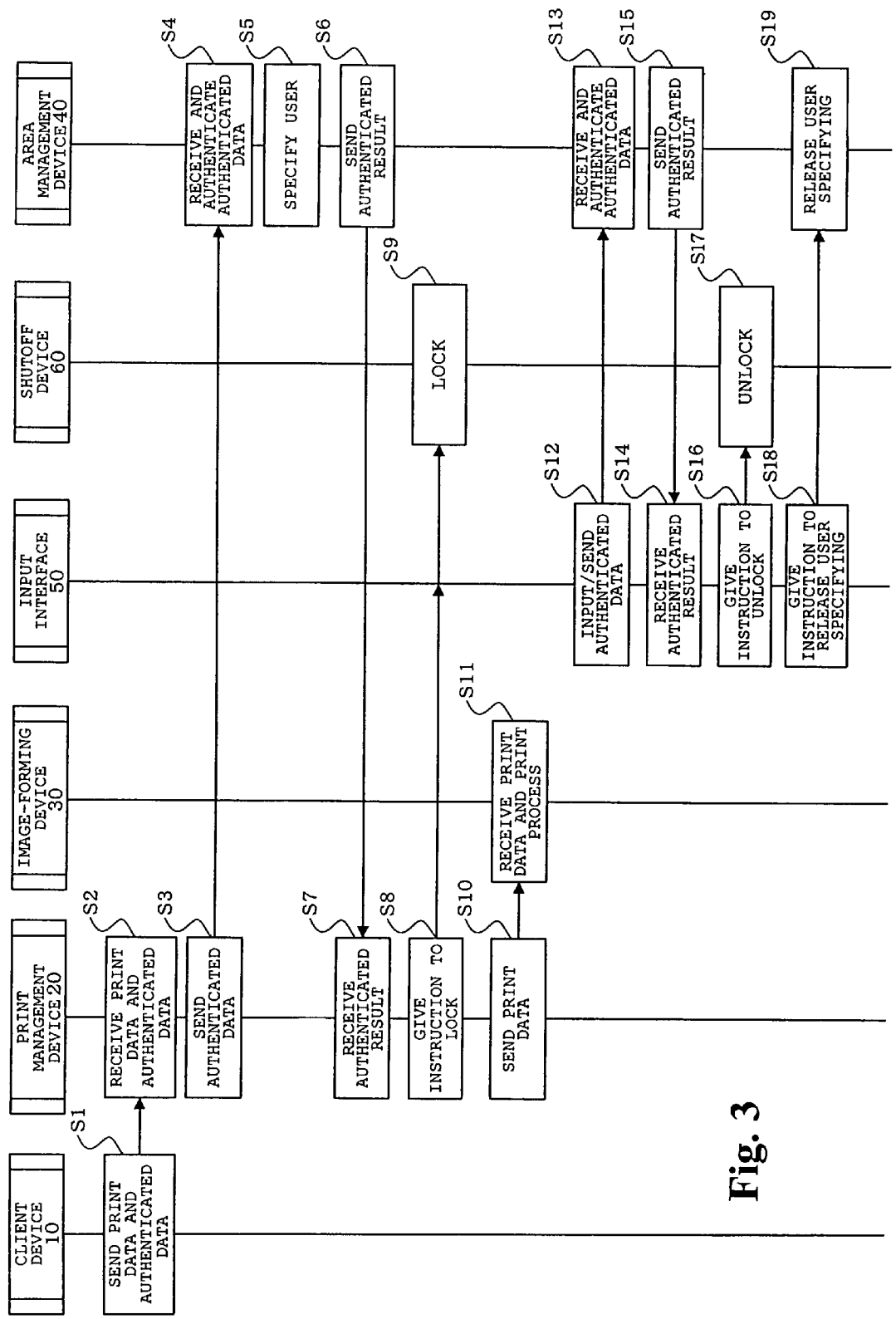
FIG. 3 is a sequence showing procedure in the printing system according to one embodiment of the present invention.

FIG. 3 is a sequence showing procedure in the printing system according to one embodiment of the present invention, and FIG. 4 is an illustration diagram of an authentication table used for user authentication.

When the user gives instructions to print out from the client device 10, the transmitted authenticated data for authenticating the user is sent to a print server with the print data (S1).

The transmitted authenticated data is the ID and the password, which is input from the user to the client device, for example.

The print management device 20 receives the print data and the authenticated data from the client device 10 (S2).

Next, the print management device 20 sends the received authenticated data to the area management device 40 and asks the authentication of the user (S3).

The area management device 40 checks the received authenticated data against the registered authentication data stored in advance, thereby authenticating the user (S4). Meanwhile, when these data conform to each other, it is judged to be valid, and if not, it is judged to be invalid. Specifically, the checking is performed by referring to the authentication table as shown in FIG. 4.

Meanwhile, if the validity is recognized as a result of the above-described authentication, the user is specified (S5). This is for improving accuracy of the authentication by using the same data to the registered authentication data, which will be a reference in the authentication to be performed later (S12 to S17).

For example, when a check result of the transmitted authenticated data is "1" as in the case of the user of which registration number is 002 shown in FIG. 4, the authenticated user is specified, and it is possible to identify this in the authentication to be performed later.

And, the result of the above-described authentication is notified to the print management device 20 (S6).

The print management device 20, which is notified by the area management device 40 that the user authentication is valid (S7) then gives instruction to lock (S8), and the shutoff device 60 locks the door of the room in which the image-forming device 30 is located (S9). Meanwhile, the procedure in which the unlock instruction is once received by the input interface 50 and the input interface 50 gives a predetermined lock instruction to the shutoff device 60 is also possible.

And the print management device 20 sends the print data to the image-forming device 30 (S10), and the image-forming device 30 outputs the print process by the output unit thereof (S11).

In this manner, by starting the printout simultaneously with the reception of the print data, it becomes possible to print without waiting the authentication to be performed later, so that high-speed print becomes possible as a result.

The user who finished giving the instruction of printout has to enter the room in which the image-forming device 30 is located in order to pickup the printed matter, and then the user has to perform the authentication again.

Specifically, the user inputs the ID and the password (input authenticated data) from the input interface 50 such as the ten-key, installed to the room, and this is sent to the area management device 40 (S12).

The area management device 40 receives and inputs the input authenticated data, and performs the authentication once again (S13).

Meanwhile, the authentication herein is performed only for the user specified in the S5, as described above.

Specifically, the registered authentication data of the user of which check result of the transmitted authenticated data is "1" and whose validity is recognized in the authentication in previous step, as of the registration numbers 002, 004 and 005 in the example shown in FIG. 4, and the input authenticated data are checked.

And, the area management device 40 notifies the result of the authentication to the input interface 50 (S15).

The input interface 50, which is notified by the area management device 40 that the user authentication is valid (S14), gives the unlock instruction (S16), and the shutoff device 60 unlocks the door of the room in which the image-forming device 30 is located (S17).

And, the input interface 50 gives the instruction to release user specifying information to the area management device 40 (S18), and the area management device 40, which receives the same, release the user specifying (S19).

Specifically, as shown in the authentication table shown in FIG. 4, the area management device 40 deletes the input authenticated data or the like of the user of which two authentications are performed, as of the registration number 005. Thereby, the room number C and the image-forming device 30 located in this room are in unused state, so that other users may print out.

Herein, the print management device 20 may be provided with means for detecting the unused image-forming device 30 from a plurality of image-forming devices 30 (unused device detecting unit 205), and further, may be provided with means for selecting one from the plurality of detected image-forming devices 30 (device selecting unit 206).

As the unused device detecting unit 205, the image-forming device 30 in the unused state is detected by referring to the above-described table, also by whether the door is locked or unlocked, and by existence or nonexistence of a person by a human sensor.

And, as the device selecting unit 206, the corresponding image-forming device may be selected automatically or manually according to the content of the print (color output, both sides printing or the like).

Thereby, not only the output from a plurality of users (client devices 10) becomes possible, but also a plurality of print process may be performed immediately.

In addition, by applying the above-described process sequences (S1 to S19) for each output, it is also possible to maintain the security of each printed matter.

And, it is possible that the door is automatically locked just after the user enters the room or after a predetermined time has passed, and freely opened and closed only from inside. Thereby, other than the authenticated user may not enter or leave the room, so that the security is further improved.

And, it is configured that the door is not locked after the user who pickups the printed matter leaves the room. Thereby, the room is in the unused state, so that unused image-forming device detection may be performed by the print management device 20.

As described above, the printing system 1 of the present embodiment not only performs the user authentication and allows the user of which validity is recognized to print out, but also allows the user to pickup the printed matter.

Specifically, it is configured that the access to the area in which the image-forming device 30 is located is limited by the user authentication, and only the authenticated user may access the image-forming device 30 to pickup the printed matter.

By utilizing such a close-door character of the area, extremely highly confidential print process becomes possible, and the security effect higher than that of the conventional mailbox printing and the like may be exerted.

And, as described above, since the image-forming device 30 is located in the closed room 80, if the printout is started upon the authentication of the authenticated data from the client device 10, the security of the printed matter is sufficiently maintained. And, by performing the authentication again when entering the room, the effect thereof is improved.

In this manner, since the printout may be started at the early stage after the instruction of printing by the client device 10, a situation that the user waits for the printout to be finished at the image-forming device 30 as a conventional mailbox hardly occurs, so that it becomes possible to realize the efficiency of the print process and the improvement of the security in the same time.

Further, the printing system 1 of this embodiment may realize a secure printing system by implementing the general image-forming device 30 to the system without adding special function.

Therefore, it is possible to realize and provide a versatile printing system 1 of which cost is small.

As described above, although the preferred embodiment of the output management system of the present invention has been described, it goes without saying that the output management system according to the present invention is not limited to the above-described embodiment, and various changes may be made without departing from the scope of the invention.

For example, the output management system of the present invention may realize a video playing system by adopting a video server as the terminal device and a player and a monitor as the output device, and it becomes possible to utilize the same in a members-only or paid video rental room or the like.

And, the output management system of the present invention may be utilized as an automated teller system by adopting an ATM (automated teller machine) as the output device.

The present invention is preferably utilized as a system provided with the output unit, authentication unit and the predetermined area.

What is claimed is:

1. An output management system comprising:
   a shutoff device for shutting off access of a user to an area in which an output device is located;
   a storing unit for storing a registered authentication data;
   an inputting unit for inputting input authenticated data;
   a checking unit for checking said input authenticated data against said registered authentication data;
   a shutoff releasing unit for releasing a shutoff by said shutoff device when said input authenticated data and said registered authentication data conform to each other;
   an area management device which has said storing unit, said inputting unit, said checking unit and said shutoff releasing unit, for managing the access of said user to said area;
   a sending unit for receiving process data sent from a terminal device and sending the same to the output device;
   a receiving unit for receiving transmitted authenticated data from said terminal device with said process data;
   a second checking unit for checking said transmitted authenticated data against said registered authentication data;
   a shutoff executing unit for allowing said shutoff device to shut off the access of said user to said area, when said transmitted authenticated data and said registered authentication data conform to each other; and
   a data management device which has said sending unit, said receiving unit, said second checking unit and said shutoff executing unit,
   a data sending controlling unit which is provided in said data management device for sending the process data sent from said terminal device to said output device when said transmitted authenticated data and said registered authentication data conform to each other,
   an unused device detecting unit which is provided in said data management device for detecting an unused output device; and
   a device selecting unit which is provided in said data management device for selecting one output device from one or more output devices detected by said unused device detecting unit,
   wherein said data management device allows said shutoff executing unit and said data sending controlling unit to execute in response to the output device selected by said device selecting unit and an area thereof, and
   said area management device allows said checking unit and said shutoff releasing unit to execute in response to the output device selected by said device selecting unit and the area thereof.

2. The output management system according to claim 1, wherein
   said checking unit of the area management device checks the registered authentication data in a case in which said transmitted authenticated data and said registered authentication data conform to each other in the checking unit of said data management device against said input authenticated data, and
   said shutoff releasing unit releases the shutoff by said shutoff device when said registered authentication data and said input authenticated data conform to each other.

3. The output management system according to claim 1, wherein
   said output device comprises the output unit for outputting based on the process data sent by said data sending controlling unit, and
   said output unit starts the output simultaneously with reception of said process data.

4. The output management system according to claim 3, wherein said output unit outputs based on said process data in a case in which the shutoff is released by said shutoff releasing unit after the access to the area is shut off by said shutoff executing unit.

5. An output management method comprising:
   a sending step for sending process data and transmitted authenticated data by a terminal device;
   a sending step for sending said transmitted authenticated data received from said terminal device to an area management device by a data management device;
   a checking step for checking the transmitted authenticated data received from the data management device against a predetermined registered authentication data by said area management device;
   a shutting off step for shutting off access to an area in which an output device is located by a shutoff device when said transmitted authenticated data and said registered authentication data conform to each other;
   a sending step for sending the process data to a predetermined output device by said data management device;
   an output processing step for performing output processing based on the process data from said data management device by said output device;
   a checking step for inputting input authenticated data to said area management device and checking the same against said registered authentication data; and
   a shutoff releasing step for releasing a shutoff by said shutoff device when said input authenticated data and said registered authentication data conform to each other;
   said data management device receiving the process data sent from the terminal device and sending the same to the output device;
   wherein the data management device executes:
   a receiving step for receiving the transmitted authenticated data from said terminal device with said process data;
   a checking step for checking said transmitted authenticated data against said registered authentication data;
   a shutoff executing step for allowing said shutoff device to shut off the access of said user to said area when said transmitted authenticated data and said registered authentication data conform to each other; and
   a data sending controlling step for sending the process data sent from said terminal device to said output device when said transmitted authenticated data and said registered authentication data conform to each other; wherein
   said data management device further executes:
   an unused device detecting step for detecting an unused output device; and
   a device selecting step for selecting one output device from one or more output device detected in said unused device detecting step; and said device executes said shutoff executing step and said data sending controlling step in response to the output device selected in said device selecting step and the area thereof; and said area management device executes said checking step and said shutoff releasing step in response to the output device selected in said device selecting step and the area thereof.

6. The output management method according to claim 5, wherein said output device includes:

an outputting step for outputting based on the process data sent in said data sending controlling step, and said outputting step starts outputting simultaneously with reception of said process data.

7. The output management method according to claim 6, wherein said outputting step outputs based on said process data in a case in which the shutoff is released in said shutoff releasing step after the access to the area is shut off in said shutoff executing step.

8. A non-transitory computer-readable recording media for allowing a computer comprising a terminal device, an output device, a data management device, an area management device and a shutoff device to execute:

a step for sending process data and transmitted authenticated data by said terminal device;

a step for sending said transmitted authenticated data received from said terminal device to said area management device by said data management device;

a step for checking the transmitted authenticated data received from the data management device against a predetermined registered authentication data by said area management device;

a step for shutting off access to an area in which said output device is located by said shutoff device;

a step for sending the process data to a predetermined output device by said data management device;

a step for performing output processing based on the process data from said data management device by said output device;

a step for inputting input authenticated data to said area management device and checking the same against said registered authentication data; and a step for releasing a shutoff by said shutoff device when said input authenticated data and said registered authentication data conform to each other;

said data management device receiving the process data sent from the terminal device and sending the same to the output device;

wherein the data management device executes:

a step for receiving the transmitted authenticated data from said terminal device with said process data;

a step for checking said transmitted authenticated data against said registered authentication data;

a step for allowing said shutoff device to shut off the access of said user to said area when said transmitted authenticated data and said registered authentication data conform to each other;

a step for sending the process data sent from said terminal device to said output device when said transmitted authenticated data and said registered authentication data conform to each other;

wherein said data management device further executes:

a step for detecting an unused output device;

a step for selecting one output device from one or more output device detected in said unused device detecting step; and the shutoff executing step and the data sending controlling step in response to the output device selected in the device selecting step and the area thereof; and said area management device executes the checking step and the shutoff releasing step in response to the output device selected in the device selecting step and the area thereof.

9. A non-transitory computer-readable recording media according to claim 8, wherein said checking step by the area management device checks the registered authentication data in a case in which said transmitted authenticated data and said registered authentication data conform to each other in the checking step of said data management device against said input authenticated data, and said shutoff releasing step releases the shutoff by said shutoff device when said registered authentication data and said input authenticated data conform to each other.

10. A non-transitory computer-readable recording media according to claim 8, wherein said output device executes:

an outputting step for outputting based on the process data sent in said data sending controlling step, and said outputting step starts outputting simultaneously with reception of said process data.

11. A non-transitory computer readable recording media according to claim 10, wherein said outputting step outputs based on said process data in a case in which the shutoff is released in the shutoff releasing step after the access to the area is shut off in a shutoff executing step.

12. The output management method according to claim 5, wherein said checking step by the area management device checks the registered authentication data in a case in which said transmitted authenticated data and said registered authentication data conform to each other in the checking step of said data management device against said input authenticated data, and said shutoff releasing step releases the shutoff by said shutoff device when said registered authentication data and said input authenticated data conform to each other.

* * * * *